United States Patent
Lunt et al.

(10) Patent No.: US 7,117,254 B2
(45) Date of Patent: *Oct. 3, 2006

(54) METHOD OF INDUCING CONTENT UPLOADS IN A SOCIAL NETWORK

(75) Inventors: Christopher Lunt, Mountain View, CA (US); Jonathan Abrams, Mountain View, CA (US); Samuel Sanchez, Santa Ana, CA (US)

(73) Assignee: Friendster, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/156,091

(22) Filed: Jun. 17, 2005

(65) Prior Publication Data

US 2005/0235062 A1   Oct. 20, 2005

Related U.S. Application Data

(63) Continuation-in-part of application No. 10/462,142, filed on Jun. 16, 2003, now Pat. No. 7,069,308.

(51) Int. Cl.
G06F 15/16 (2006.01)

(52) U.S. Cl. ............ 709/218; 709/204; 709/217; 709/219; 709/227; 709/228; 707/3; 707/5; 705/1; 705/7; 705/8; 705/9; 705/10

(58) Field of Classification Search ............ 709/204, 709/217–219, 227, 228; 707/3, 5; 705/1, 705/7–10

See application file for complete search history.

(56) References Cited

U.S. PATENT DOCUMENTS

| | | | |
|---|---|---|---|
| 5,950,200 A | 9/1999 | Sudai et al. | |
| 5,963,951 A | 10/1999 | Collins | |
| 5,978,768 A | 11/1999 | McGovern et al. | |
| 6,052,122 A | 4/2000 | Sutcliffe et al. | |
| 6,061,681 A | 5/2000 | Collins | |
| 6,073,105 A | 6/2000 | Sutcliffe et al. | |

(Continued)

OTHER PUBLICATIONS

U.S. Appl. No. 10/854,054, filed May 26, 2004, Galbreath et al.

(Continued)

Primary Examiner—Bharat Barot
Assistant Examiner—Liang-che Alex Wang
(74) Attorney, Agent, or Firm—Patterson & Sheridan, LLP

(57) ABSTRACT

A method of inducing content uploads in an online network includes the steps of storing content relating to a first member of the network that is submitted by a second member of the network, receiving approval of the content from the first member, and associating the content with the first member. The uploaded content may comprise an image file containing a photo of the first member and a caption associated with the photo image. The second user uploads the content relating to the first member using a GUI. This GUI is made available to the second user through a hyperlink that appears when a profile page of the first member is accessed if the degree of separation between the first member and the second member is less than or equal to a maximum degree of separation set by the first user. On the other hand, the hyperlink to this GUI will not appear when the profile page of the first member is accessed by the second member if the degree of separation between the first member and the second member is greater than the maximum degree of separation set by the first user. The default setting for this maximum degree of separation is one.

20 Claims, 15 Drawing Sheets

U.S. PATENT DOCUMENTS

| | | |
|---|---|---|
| 6,073,138 A | 6/2000 | De L'etraz et al. |
| 6,175,831 B1 | 1/2001 | Weinreich et al. |
| 6,249,282 B1 | 6/2001 | Sutcliffe et al. |
| 6,269,369 B1 | 7/2001 | Robertson |
| 6,324,541 B1 | 11/2001 | De L'etraz et al. |
| 6,363,427 B1 | 3/2002 | Teibel et al. |
| 6,366,962 B1 | 4/2002 | Teibel |
| 6,370,510 B1 | 4/2002 | McGovern et al. |
| 6,542,748 B1 * | 4/2003 | Hendrey et al. ......... 455/456.1 |
| 6,735,568 B1 * | 5/2004 | Buckwalter et al. ........... 705/1 |
| 7,069,308 B1 * | 6/2006 | Abrams ..................... 709/218 |
| 2002/0023132 A1 | 2/2002 | Tornabene et al. |
| 2002/0059201 A1 | 5/2002 | Work |
| 2002/0086676 A1 | 7/2002 | Hendrey et al. |
| 2003/0154194 A1 | 8/2003 | Jonas |
| 2004/0034601 A1 | 2/2004 | Kreuzer |
| 2004/0144301 A1 | 7/2004 | Neudeck et al. |
| 2004/0148275 A1 | 7/2004 | Achlioptas |

OTHER PUBLICATIONS

U.S. Appl. No. 10/854,057, filed May 26, 2004, Galbreath et al.

* cited by examiner

System Diagram

Database

FIG. 3a
Data Collection Interface

| Email Address: | |
|---|---|
| Repeat Email Address: | |
| First Name: | |
| Last Name: | |
| Password: | |
| Repeat Password: | |
| Gender: | ○ Male ○ Female |

Interested in Meeting People for:

☑ Dating       ○ Men   ○ Women
☑ Serious Relationship    ○ Men and Women
☑ Friends
☑ Activity Partners
☐ Just Here to Help Did a friend refer you to Friendster?
Friend's email address:
(To automatically connect to your friend and your friend's friends.)

302

306
User Interface

304

| Status: | ○ Single/Divorced/Separated<br>○ In a Relationship<br>○ Married<br>○ Open Marriage |
|---|---|
| Date of Birth: | ▼ ▼ ▼ |
| Country: | ▼ |
| Zip/Postal Code: | (U.S. & Canada Only) |
| Hometown: | (Where you grew up) |
| Occupation: | |
| Interests: | (Separate Interests with Commas) |

Image Collection Interface

FIG. 4
Invitation Interface

404 User Interface

402

| Subject: | Invitation to join Friendster from John Doe |
|---|---|
| From: | user@domain.com |
| To: | (Separate multiple addresses with commas) [Import from your Address Book] |
| Optional Personal Message: | |
| Message Body: | John Doe has invited you to jo 24 ohn's personal and private community at Friendster, where you and John can network with each other's friends.<br><br>Friendster is an online community that connects people through networks of friends for dating or making new friends.<br><br>Friendster is for people who are single, people in relationships, and anyone who wants to make new friends or help their friends meet new people.<br><br>You can use Friendster to:<br><br>* Meet new people to date, through your friends and their friends<br>* Make new friends<br>* Help your friends meet new people<br><br>Once you join Friendster, you will be automatically connected to your friend John, and all of John's friends.<br><br>Click below to join Friendster:<br>http://www.friendster.com/join.jsp?invite=140807 |

FIG. 5
Gallery Diagram

Data Presentation Interface

Invitation Process Flowchart

Path Calculation Process Flowchart

Summary Flowchart

FIG. 13

Submit a Photo for User A   1300

You can now submit a photo for a friend. Choose the picture from your computer and add an optional caption. Your friend will then have the option to approve your picture and count it as one of their own.

Upload a Photo    1311

[ Browse... ]

Caption (optional)    1312

Photo captions can be up to 100 characters.

1313
[ Submit ]

Use a JPG, GIF, or PNG file (maximum size of 500KB)
Do not submit photos containing children, pets, cartoons, celebrities, nudity, artwork or copyrighted images. (Photo Policy)

[ Back To User A's Page ]

METHOD OF INDUCING CONTENT UPLOADS IN A SOCIAL NETWORK

RELATED APPLICATION

This application is a continuation-in-part of application Ser. No. 10/462,142, filed Jun. 16, 2003 now U.S. Pat. No. 7,069,308, entitled "System, Method and Apparatus for Connecting Users in an Online Computer System Based on Their Relationships within Social Networks."

BACKGROUND OF THE INVENTION

1. Field of the Invention

The present invention generally relates to data processing, and more particularly, to a method and system for inducing content uploads in an online social network.

2. Description of the Related Art

In 1967, the social psychologist Stanley Milgram conducted experiments regarding the "Small Word" theory—the theory that members of any large social network would be connected to each other through short chains of intermediate acquaintances. His finding that the average length of the resulting acquaintance chains was roughly six people has since been popularized as the "Six Degrees of Separation" phenomenon. The study of social networks has evolved into a thriving field of science, and resulted in even deeper analysis of Milgram's findings. For example, Duncan Watts' book Six Degrees provides a relatively technical study of social networks, and offers a quite detailed bibliography of works in the field. The compelling idea behind social networking theory is that people can theoretically leverage their friends and acquaintances to eventually meet any desired person.

In their daily lives, people routinely operate within their social network to meet new people for a variety of reasons such as:

1. Romantic involvement (dating, physical relationships, marriage, etc.)
2. Friendship
3. Activity partners
4. Professional reasons (career advancement, job-seeking, etc.)
5. Commercial benefit (buying and selling goods and services, developing inter-organizational relationships, etc.)
6. Non-profit and political benefit ("grass-roots" networking in support of political or philanthropic causes.

The vast majority of marriages, romantic relationships and friendships are developed through social networks. In business, it is not a secret that the difference between failure and success often depends on not "what you know," but "who you know."

There are several reasons people prefer meeting new people through social networks: it is more comfortable, it is more efficient and it is more likely to lead to desirable relationships than other methods.

Interacting through social networks is more comfortable than interacting with strangers, because it reduces the risks of rejection, deception, and even physical danger in some cases. These risks are especially acute when it comes to meeting people for dating. One way to meet people for dating is for one individual to simply approach another individual in a public forum, such as a bar, a park, etc. In an archetypical case, a man might approach a woman to strike up a conversation. Two problems immediately arise. First, the woman is likely to simply reject the man for any number of reasons (involvement in another relationship, for example). Second, without any mutual friend (or friend of friend) to provide information about the man, the woman has little context for knowing how truthful the man's statements about his background, occupation, etc., are.

While the previous example describes a specific, if quite common, form of meeting people, many of the same risks also occur in social interactions where the goal is not dating. When looking for a new friend, developing a business relationship or simply seeking an activity partner, people are adverse to the risks of rejection, deception and incompatibility.

Generally, it is easy to understand that meeting people through friends or through friends of friends significantly reduces the risks described. If an introduction is made through a mutual acquaintance, social norms all but ensure there will be no immediate outright rejection. Further, an individual is unlikely to engage in deception when there is a third party involved who can confirm or discredit any assertions by that acquaintance.

Another great benefit of interacting through a social network is the enhanced efficiency of the process (from introduction through establishing a relationship) and the higher level of quality in relationships established through social networks.

When two individuals meet through a mutual acquaintance (or series of such acquaintances) several factors are introduced. The two individuals are more likely to be compatible, for the simple reason that their mutual friendships is itself likely to be indicative of shared preferences and interests.

The mutual acquaintance(s) also provides a valuable function in facilitating the development of a relationship. The mutual acquaintance provides an initial matchmaking and/or screening function between the two individuals. For example, the mutual acquaintance can observe shared interests or aspirations ("she would be great for you, you both like skiing so much"). Or the mutual acquaintance can provide valuable information with regard to status—"she's married" or "he's not interested in dating right now."

The mutual acquaintance can further facilitate development of the relationship. Obviously, the mutual acquaintance can facilitate the introduction—from a simple e-mailed suggestion the two parties meet, to arranging, say, a dinner party to bring the two individuals together.

The mutual acquaintance can also facilitate the flow of information among the individuals. For example, one individual might have questions about the other ("what does he do for a living?", "what is he like"), the answers to which can determine the probability of compatible interests.

Once the introduction has been made, the mutual acquaintance can facilitate further dialog, and a deepening of the relationship. Either individual may consult the mutual acquaintance with respect to the interest level of the other individual ("what does she think of me"?)

While the benefits of developing relationships through a social network are obvious, the method also has some deficiencies. In particular, there remains a high likelihood that the first and second individuals will never be introduced by the mutual acquaintance for a number of reasons, not the least of which is pure chance. There is also the possibility that the time elapsed before the two individuals meet (from the first moment both have established a personal relationship with the mutual acquaintance) may be longer than desirable.

The failure of two individuals in a social network to form a personal relationship may occur for a variety of reasons.

The introduction of two individuals in a social network relies on the enthusiasm, focus, resources and time constraints of the mutual acquaintance.

The mutual acquaintance may simply fail to recognize the potential for a match among people in his/her network. Or, two sequential mutual acquaintances (A knows B, B knows C, and C knows D) may fail to communicate in such a way that they recognize the potential for a match (i.e., between A and D).

Further, the mutual acquaintance may not have the time for introducing the two individuals, or may simply not prioritize facilitating the introduction. Arranging a mutual meeting might involve hosting an event or trying to coordinate three schedules (the two individuals and the mutual acquaintance). When a longer sequence of mutual acquaintances connects two individuals, the problems are only magnified.

Finally, the mutual acquaintance might live in a different location from the two individuals, so facilitating an introduction may be quite impractical. As our world becomes increasingly mobile, this situation only becomes more common.

In short, while social networking is a preferred way for individuals to connect, the method has several inefficiencies as it operates in the "real" world.

Some attempts have been made to use the Internet for "matching" people, but none have been able to harness the clear advantages of social networks.

Several online "matching" sites for dating and friend-making currently operate on the Internet (Match.com, Matchmaker.com, etc.), and several patents have been granted for online matching systems (Sudai, et al. U.S. Pat. No. 5,950,200; Collins U.S. Pat. No. 5,963,951; Sutcliffe, et al. U.S. Pat. No. 6,052,122; Collins U.S. Pat. No. 6,061,681; Sutcliffe, et al. U.S. Pat. No. 6,073,105; Sutcliffe, et al. U.S. Pat. No. 6,073,105).

These services are generally similar in function. They allow users to post profiles and photos, as well as search through the profiles and photos of other users. Communication between users is provided anonymously, since users are identified by pseudonyms. Matching features are provided which match users based on indicated profile criteria about themselves and their desired matches.

These matching services are based on rote screening of criteria, behind walls of anonymity. They do not provide any features for community, collaboration, referral or reputation. Users cannot participate in these online dating services within the context of the social networks that connect participants, nor leverage their own social network in viewing, selecting, or communicating with other people on these online dating services. None of the previously mentioned advantages of a social network—in particular, the critical function performed by mutual acquaintances—exist in these matching systems.

Other online services offer forums for communication between communities of users. These services include message boards, email lists, chat rooms, personal home pages, and web logs (see, for examples, U.S. patents: Teibel U.S. Pat. No. 6,366,962; and Teibel et al. U.S. Pat. No. 6,363,427). Such services exist for both one-to-many and many-to-many communication. These services provide a forum where profiles or messages are viewed by a specific individual, the general public or the entire membership of a specific defined group.

These types of forums do allow visibility to multiple members of a group (in contrast to the matching services, which are based on one-one anonymous profiles). However, they typically are not based on social networks, but on broad interests. For example, a forum may have as its subject "skiing". Further, it is not possible with these services to limit visibility of content based on social relationships or distance levels within a social network. Identification is either anonymous or via public disclosure of real names, but depiction of connections between people via social networks is not provided.

Several patents and patent applications (although apparently no inventions in actual use) appear to recognize the value of social networks, and contemplate online systems to exploit them (de l'Etraz et al. U.S. Pat. No. 6,073,138; de l'Etraz et al. U.S. Pat. No. 6,324,541; Tomabene 20020023132; and Work 20020059201). These systems generally rely on a company's or an individual's computerized address book, and suggest merging multiple address books to create a social networking tool.

The address book solutions contemplated by de l'Etraz, Tomabene and Work fail to leverage social networks in several fairly significant ways. First, they do not contemplate the nature of the relationship among individuals. They simply assume that the existence of a name in a person's address book denotes a social relationship. In fact, many address books are filled with non-social relationships (e.g. the name of a dry-cleaner). Second, the address book solutions appear to be one-way: they do not allow two individuals in a network to indicate they have a mutual relationship. So for example, an individual may have "John Doe at ACME Corp." in his address book, but these systems would not be able to confirm whether or not "John Doe" considers himself an acquaintance of the individual. Finally, these address book services fail to leverage many of the benefits of mutual acquaintances, such as referrals and testimonials.

SUMMARY OF THE INVENTION

The present invention provides a system for connecting people via an online database and, more specifically, calculates, displays and allows searching of social networks. It further facilitates interaction among people connected through a social network. The system includes a user interface means, such as a graphical user interface, to obtain descriptive data and relationship data for users of the system. Descriptive data generally describes characteristics and preferences of a user, while relationship data describes other individuals in the user's social network. For example, a descriptive data element may be that a user is interested in a certain hobby, say, skiing. An example of relationship data might be that a certain user is a friend of a certain other user.

The system further includes a database means for storing the descriptive and relationship data of users of the system. A calculation process has the ability to aggregate and calculate the data to create a map of any user's social network, to any degree of separation. All, or a portion, of this social network map can be presented, along with descriptive data about the users. Further the pathway of intermediate acquaintances connecting any two users can be calculated and displayed.

An invitation system allows users to invite friends or acquaintances to join the system. Invitations may be sent, for example, by e-mail. The invited friend or acquaintance may accept the invitation, and then become a user of the system, as a 'friend' of the inviting user. The new user is prompted to provide descriptive data and the relationship data for friends or acquaintances who they would like to join the system. It is a unique and important feature of the invention that the invitation system (as well as related communication systems within the invention) allows two users to confirm that they are "friends" and therefore become designated as such in the system.

Users in the system further have the ability to provide information about one another. For example, one user might write a positive comment about a second user's personality. In one implementation, the second user may accept or reject display of the comment. Further, in this implementation, any other users who are connected to the second user through any number of acquaintance pathways may see the comment as part of the "descriptive data" about the second user.

In one exemplary example of operation, a first user might access a graphical interface to view descriptive data about other users in her social network. As she discovers other users who have characteristics she finds appealing, she can view the acquaintance path that connects her to the other users. She may select a particular user, and view the acquaintance pathway or pathways that connect her to that user. She may further read comments that the users friends or acquaintance have written about him. Based on her judgment of the descriptive data, the pathway data and the comments, she may wish to communicate with the user. She may contact the user through the communication system or may further use the communications system to ask to be introduced by intermediate acquaintances. The communication may further send notification to the user, indicated that another user is interested in being introduced to him.

Thus, the present invention allows individuals to replicate the process of developing personal relationships through social networks, using a computer system and database. The system calculates and displays social networks allowing users to manage and utilize those networks. The user benefits from the advantages of social networking, and further improves the value of the social network, because the system simplifies, accelerates and eases the process of developing relationships through a social network. Specifically, the system first allows individuals who are connected by a social network to realize the existence of each other as well as the pathway of intermediate acquaintances that connect them. Second, it allows individuals to determine their mutual interest without requiring the active participation of the acquaintance intermediaries that connects them. Finally, the system reduces the difficulty of making introductions by eliminating or reducing the intermediate acquaintances' burden of coordinating introduction.

The present invention further provides a method of inducing content uploads in an online network, and a user profile management system for carrying out the method. The method according one embodiment includes the steps of storing content relating to a first member of the network that is submitted by a second member of the network, receiving approval of the content from the first member, and associating the content with the first member. The uploaded content may comprise an image file containing a photo of the first member and a caption associated with the photo image.

According to another aspect of the invention, the second user uploads the content relating to the first member using a GUI. This GUI is made available to the second user through a hyperlink that appears when a profile page of the first member is accessed if the degree of separation between the first member and the second member is less than or equal to a maximum degree of separation set by the first user. On the other hand, the hyperlink to this GUI will not appear when the profile page of the first member is accessed by the second member if the degree of separation between the first member and the second member is greater than the maximum degree of separation set by the first user. The default setting for this maximum degree of separation is one, which means that only friends of a member may upload photos on behalf of that member.

The user profile management system according to another embodiment of the invention carries out the method of inducing content uploads in an online network. The system includes a memory device that stores user profiles and information about relationships between users, and a processing unit that is programmed to permit upload of content relating to a first user from a second user if a degree of separation between the first user and the second user is less than or equal to a maximum degree of separation set by the first user. The default setting for this maximum degree of separation is one, in which case only friends of a member may upload content on behalf of that member. The uploaded content may comprise an image file containing a photo of the first member and a caption associated with the photo image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3a shows exemplary graphical user interface for data collection in the form of web screens for data collection in accordance with one embodiment of the present invention.

FIG. 4 shows an exemplary graphical user interface for inviting individuals to join the system in the form of a web screen for inviting new users in accordance with one embodiment of the present invention.

FIG. 5 shows an exemplary graphical user interface for displaying a "gallery" of descriptive and relationship data of uses in a particular social network in accordance with one embodiment of the present invention.

FIG. 13 is a sample graphical user interface for submitting photos on behalf of another member of the social network.

DETAILED DESCRIPTION

Figure 1:
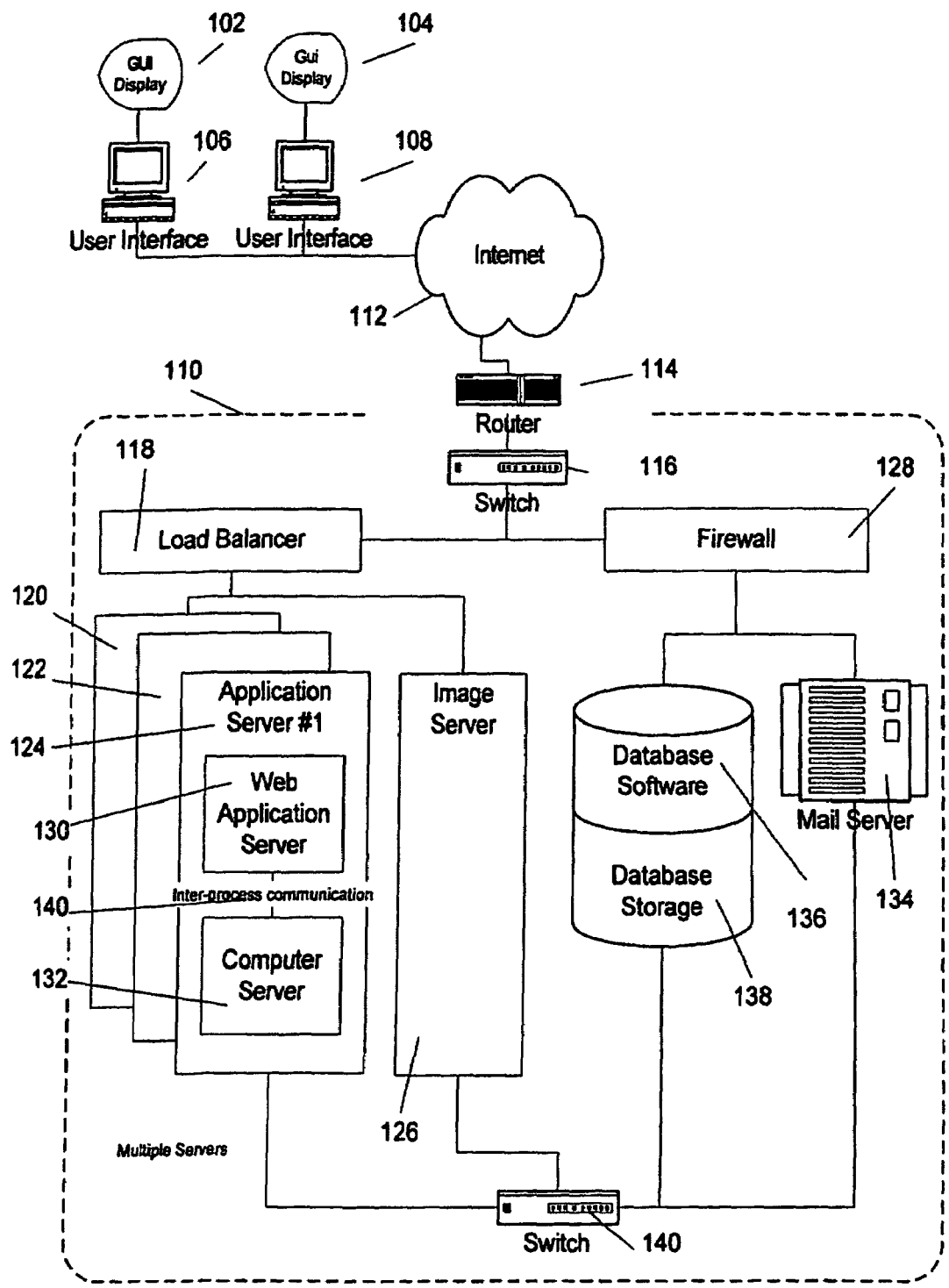
FIG. 1 shows a block diagram of components of a system for connecting people based on their relationships within social networks in accordance with one embodiment of the present invention.

Embodiments of the present invention are described herein in the context of a system, method, and apparatus for connecting users in an online computer system based on their relationships within social networks. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Definitions

Degrees of Separation. The number of connections linking any two individuals in a social network. For example if individual A is connected to individual B through two intermediate acquaintances (C and D) they are connected at three degrees of separation.

Descriptive Data. Information that describes a user or characteristics of a user. For example, descriptive data might include a first and last name. Or it might include elements that describe attributes of the user, such as gender, marital status or occupation.

Friend. In an exemplary implementation of the system, the list of users who have accepted invitations from a user to join the system or have otherwise been designated as having a direct (i.e., one degree) relationship with the user.

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations that may be made in the future, including changes and additions to existing standard protocols.)

Interface. Any mechanism by which an external individual or external computer can obtain and provide data, respectively to or from the database of the present invention. One common example of the interface is a web site. Other examples might include an e-mail message, a telephone voice message or a paper report.

Intermediate acquaintance(s). The individual or individuals connecting any two other individuals in a social network. For example, if A is connected to B through C and D (i.e., A< >C< >D< >B) then C and D are the intermediate acquaintances.

Mutual acquaintance. See "Intermediate Acquaintance"

Relationship Data. Information about the friends of a user of the system. Can include the list of friends, list of individuals invited to join the system, etc.

Social Network. An aggregation of individual social relationships, out to any number of degrees of separation.

User. An individual who has registered in the system.

Web Site. A computer system that serves informational content over a network using the standard protocols of the World Wide Web. As used herein, the term is generally intended to encompass both (i) the hardware/software server components that serve the informational content over the network, and (ii) the "back end" hardware/software components, including any non-standard or specialized components, that interact with the server components to perform services for Web site users.

FIG. 1 illustrates the general architecture of a system that operates in accordance with one embodiment of the present invention. As shown in FIG. 1, a plurality of graphical user interface (GUI) displays 102 & 104 are presented on a plurality of user interface devices 106 & 108 connected to an apparatus 110 via the Internet 112. The user interface may be any device capable of presenting data, including, but not limited to, cellular telephones, television sets or hand-held "personal digital assistants." As used herein, the term "Internet" generally refers to any collection of distinct networks working together to appear as a single network to a user. The term refers to the so-called world wide "network of networks" that are connected to each other using the Internet protocol (IP) and other similar protocols. The Internet provides file transfer, remote log in, electronic mail, news and other services. As described herein, the exemplary public network of FIG. 1 is for descriptive purposes only. Although the description may refer to terms commonly used in describing particular public networks such as the Internet, the description and concepts equally apply to other public and private computer networks, including systems having architectures dissimilar to that shown in FIG. 1. For example, and without limitation thereto, the system of the present invention can find application in public as well as private networks, such as a closed university social system, or the private network of a company.

The apparatus 110 is connected to the Internet 112 through a router 114 and a switch 116. As is well known in the relevant art(s), routers forward packets between networks. The router 114 forwards information packets between the apparatus 110 and devices 106 & 108 over the Internet 112. A load balancer 118 balances the traffic load across multiple mirrored servers 120, 122, 124 and a firewall 128 provides protection from unauthorized access to the apparatus 110. The switch 116 may act as a gatekeeper to and from the Internet 112. The components appearing in the apparatus 110 refer to an exemplary combination of those components that would need to be assembled to create the infrastructure in order to provide the tools and services contemplated by the present invention. As will be apparent to one skilled in the relevant art(s), all of components "inside" of the apparatus 110 may be connected and may communicate via a wide or local area network (WAN or LAN).

The apparatus 110 includes an application server 124 or a plurality of application servers 124. The application server 124 comprises a web application server 130 and a computer server 132 that serves as the application layer of the present invention. Yet another server is the image server 126, which has the purpose of storing and providing digital images to other components of the apparatus 110. Also included is a mail server 134, which sends and receives electronic messages to and from devices 106 & 108. Also included are the database software 136 and a database 138.

The Web application server 130 is a system that sends out Web pages in response to Hypertext Transfer Protocol (HTTP) requests from remote browsers (i.e. users of the apparatus 110). That is, the Web server 130 provides the GUI 102 & 104 to users of the system in the form of Web pages. These Web pages sent to the user's device 106 & 108 would result in GUI screens 102 & 104 being displayed.

The apparatus 110 also includes a second switch 140 that allows the components of the apparatus to be interconnected in a local area network (LAN) or a wide area network (WAN). Thus, data can be transferred to and from the various components of the apparatus 110.

As will be appreciated by those skilled in the relevant art(s), this configuration of router 114 and switch 116 is flexible and can be omitted in certain embodiments. Additional routers 114 and/or switches 116 can also be added.

The application server 124, the database(s) 136, 138 and the mail server 134 are shielded from the public Internet 112 through the firewall 128. The firewall 128 is a dedicated gateway machine with special security precaution software. It is typically used, for example, to service Internet 112 connections and dial-in lines and protects the cluster of more loosely administered network elements hidden behind it from external invasion. Firewalls are well known in the relevant art(s).

As will be appreciated by those skilled in the relevant art(s), the inclusion of the firewall 128 is flexible and can be omitted in certain embodiments. Additional firewalls 128 can also be added.

The computer server 132 may include a central processing unit (CPU), a random access memory (RAM) temporary storage of information, and a read only memory (ROM) for permanent storage of information. Computer server 132 may be generally controlled and coordinated by an operating system software. The operating system controls allocation of system resources and performs tasks such as processing, scheduling, memory management, networking and I/O services, among things. Thus, the operating system resident in system memory and executed by CPU coordinates the operation of the other elements of the apparatus 110.

Although the description of the computer server 132 may refer to terms commonly used in describing particular computer servers, the description and concepts equally apply to other processing systems, including systems having architectures dissimilar to that shown in FIG. 1.

Also included is an inter-process communications protocol 140 (IPCP), a set of rules for marshalling and un-marshalling parameters and results. This is the activity that takes place at the point where the control path in the calling and called process enters or leaves the IPCP domain. The IPCP is essentially a set of rules for encoding and decoding information transmitted between multiple processes.

As will be appreciated by those skilled in the relevant art(s), the inclusion of the IPCP 140 is flexible and can be substituted or omitted in certain embodiments.

The apparatus 110 may also include the image server 126 or a plurality of image servers that manage(s) digital photographs and other human viewable images. The image server 126 may be configured separately from the web server 130. This configuration may increase the scalability of the server apparatus 110. Alternatively, the web server 130 and the image server 126 can be configured together. Examples of image formats that can be managed by the image server 126 include, but are not limited to, Graphical Interchange Format ("GIF"), Joint Photographics Experts Group ("JPEG"), or Portable Network Graphics ("PNG") or Tagged Image File ("TIF").

The mail server 134 is a repository for e-mail messages received from the Internet 112. It also manages the transmission of electronic messages ("electronic mail" or "e-mail"). The mail server 134 consists of a storage area, a set of user definable rules, a list of users and a series of communication modules. Its primary purpose in the present invention is the storage and distribution of e-mail messages to the Internet 112.

The databases 136, 138 store software, descriptive data, digital images, system data and any other data item required by the other components of the apparatus. The databases may be provided, for example, as a database management system (DBMS), and object-oriented database management system (ODBMS), a relational database management system (e.g. DB2, ACCESS etc.), a file system or another conventional database package. Thus, the databases 136 & 138 can be implemented using object-oriented technology or via text files. Further, the databases 136 & 138 can be accessed via a Structured Query Language (SQL) or other tools known to one of ordinary skill in the art.

Figure 2:
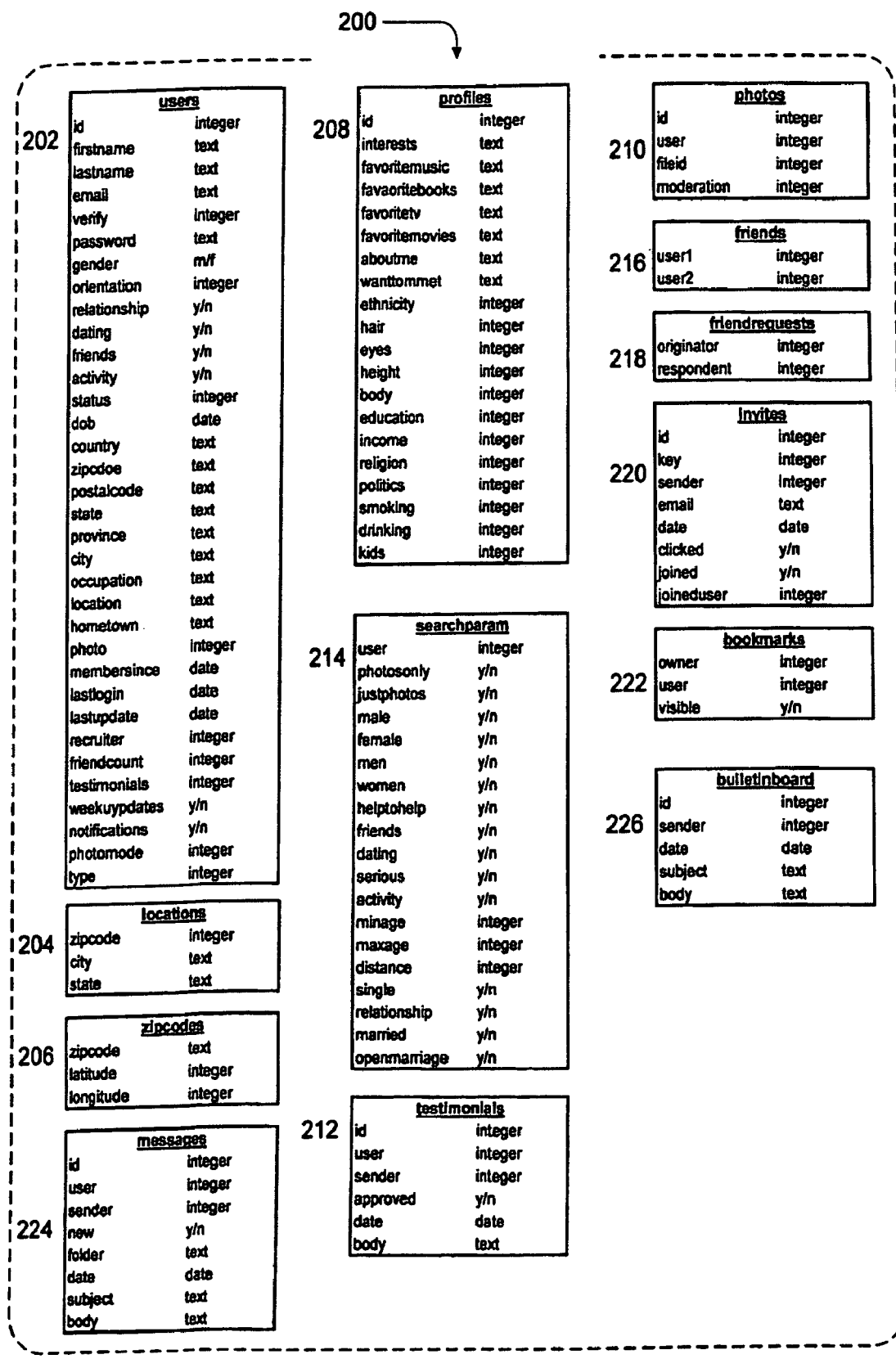
FIG. 2 shows a block diagram of a database used in the system in accordance with one embodiment of the present invention.

FIG. 2 shows a block diagram of an example of one implementation of a database 200 in accordance with one embodiment of the present invention. The database 200 may be provided, for example, as a database management system (DBMS), an object-oriented database management system (ODBMS), a relational database management system (e.g. DB2, ACCESS etc.) or another conventional database package. Thus, the database 200 can be implemented using object-oriented technology or via text files. Further, the database 200 can be accessed via a Structured Query Language (SQL) or other tools known to one of ordinary skill in the art.

Several categories of information are shown in this implementation of the database 200. The categories include descriptive data, preference data, relationship data and other data items.

As used herein, descriptive data refers to information that describes a user or characteristics of a user. For example, descriptive data might include a first and last name. Or it might include elements that describe attributes of the user, such as gender, marital status or occupation. Or it may represent a digital image—a photograph—of the user. In the present exemplary system, descriptive data is further grouped into "user data" 202, location data 204, zip code data 206, profile data 208 and photos 210. Examples of data elements for each may be described as follows.

User Data

| Element | Format |
|---|---|
| Id | Integer |
| Firstname | text |
| Lastname | text |
| Email | text |
| Verify | integer |
| Password | text |
| Gender | m/f |
| Orientation | integer |
| Relationship | y/n |
| Dating | y/n |
| Friends | y/n |
| Activity | y/n |
| Status | integer |
| Dab | date |
| Country | text |
| Zipcode | text |
| Postalcode | text |
| State | text |
| Province | text |
| City | text |
| Occupation | text |
| Location | text |
| Hometown | text |
| Photo | integer |
| Membersince | date |
| Lastlogin | date |
| Lastupdate | date |
| Recruiter | integer |
| Friendcount | integer |
| Testimonials | integer |
| Weeklyupdates | y/n |
| Notifications | y/n |
| Photomode | integer |
| Type | integer |

Profile Data

| Element | Format |
|---|---|
| Id | integer |
| Interests | text |
| Favoritemusic | text |
| Favoritebooks | text |
| Favoritetv | text |
| Favoritemovies | text |
| Aboutme | text |
| Wanttomeet | text |
| Ethnicity | integer |
| Hair | integer |
| Eyes | integer |
| Height | integer |
| Body | integer |
| Education | integer |
| Income | integer |
| Religion | integer |
| Politics | integer |
| Smoking | integer |
| Drinking | integer |
| Kids | integer |

Locations

| Element | Format |
|---|---|
| Zipcode | integer |
| City | text |
| State | text |

Zipcodes

| Element | Format |
|---|---|
| Zipcode | text |
| Latitude | integer |
| Longitude | integer |

Photos

| Element | Format |
|---|---|
| Id | integer |
| User | integer |
| Fileid | integer |
| Moderation | integer |

A special case of descriptive data in the present system is "testimonial data" 212. Testimonial data 212 result from the invention's unique ability to allow users of the system to write "testimonials" or comments about each other. In these testimonials, users can describe their relationship to an individual and their comments about that individual. For example, a user might write a testimonial that states "Jane has been a friend of mine since college. She is beautiful, loyal and a talented musician." In one embodiment of the invention, testimonial data 212 is not presented as descriptive data until approval is received from the individual the testimonial describes. Examples of testimonial data elements may be described as follows:

Testimonials

| Element | Format |
|---|---|
| Id | integer |
| User | integer |
| Sender | integer |
| Approved | y/n |
| Date | date |
| Body | text |

Preference data refers to data that describes preferences one user has with respect to another. Many of the data fields used to capture descriptive data can also be used to capture preference data (for example, "hair color." In the descriptive context, someone might 'have brown hair'; while in the preference context that person might 'prefer blond hair.' In the present system, any or all of the descriptive data outlined above, can be treated as a search parameter. In the present exemplary system, most preference data, when presented in a GUI, is presented in hypertext markup language, or HTML. By selecting (usually by clicking on the word) any descriptive data, the user is able to view a subset of other users, within her network, with a similar interest. For example, if in viewing a profile 604 of FIG. 6, clicking, a user clicked on "tennis," would see all users in her network who had expressed an interest in tennis. Alternatively, the system also allows users to type any search terms they desire into a search box, which will also search the descriptive data and present the results.

In the present embodiment, further preference data is contained in the search parameters 214. These search parameters can allow a user to describe more preferences to the system. For example, a user could indicate that she is looking for a male who is seeking a female for a serious relationship. Examples of search parameters elements may be described as follows:

| Search Parameters | |
|---|---|
| Element | Format |
| User | integer |
| Photosonly | y/n |
| Justphotos | y/n |
| Male | yin |
| Female | yin |
| Men | y/n |
| Women | y/n |
| Helptohelp | y/n |
| Friends | y/n |
| Dating | y/n |
| Serious | y/n |
| Activity | y/n |
| Minage | integer |
| Maxage | integer |
| Distance | integer |
| Single | y/n |
| Relationship | y/n |
| Married | y/n |
| Openmarriage | y/n |

Relationship data is data that describes how individuals are connected. In accordance with one embodiment of the present invention, three types of relationship data are captured: friends 216, friendrequests 218 and invites 220. Friends 216 data generally refers to relationships among users that have been verified by the system: a user has asked another individual to join the system as friend or acquaintance, and the request has been accepted. Friendrequests data 218, generally tracks requests by users within the system to other individuals, which requests have not yet been accepted. Invites data 220 generally describes the status of a request by a user to invite an individual outside the system to join the system, such as whether the request has been accepted, ignored, re-sent, etc. Examples of relationship data elements may be described as follows:

| Friends | |
|---|---|
| Element | Format |
| user1 | integer |
| user2 | integer |

| Friendrequests | |
|---|---|
| Element | Format |
| Originator | integer |
| Respondent | integer |

| Invites | |
|---|---|
| Element | Format |
| Id | integer |
| Key | integer |
| Sender | integer |
| Email | text |
| Date | date |
| Clicked | y/n |
| Joined | y/n |
| Joineduser | integer |

Other data items relate to operating components of the exemplary system. Such other data items include bookmarks 222, messages 224 and bulletinboard 226. Bookmarks 222 provide the data for a process allowed wherein a user can indicate an interest in the profile of another a user. This indication creates a "bookmark," showing that the first user has a special interest in the profile of the second user. The bookmark may be made visible to the other user, or, in another implementation, hidden from the other user. In one implementation, the bookmarks may be collected and displayed in a bookmark list.

The data collected in messages 224 generally relates to the operation of an internal messaging system whereby users may send one another private messages.

The bulletinboard data 226 generally supports the operation of a bulletin board that users can use to conduct online discussions. Unique to the present system is the ability to restrict bulletin board access to individuals within a certain number of degrees of relationship.

| Bookmarks | |
|---|---|
| Element | Format |
| Owner | integer |
| User | integer |
| Visible | y/n |

| Messages | |
|---|---|
| Element | Format |
| Id | integer |
| User | integer |
| Sender | integer |
| New | y/n |
| Folder | text |
| Date | date |
| Subject | text |
| Body | text |

| Bulletinboard | |
|---|---|
| Element | Format |
| Id | integer |
| Sender | integer |
| Date | date |
| Subject | text |
| Body | text |

FIG. 3a shows a diagram of exemplary screens 302, 304 provided to a user through an interface 306, such as over the Internet, to obtain user descriptive data, as detailed above. One screen shown in this example 302 collects data allowing the user to login securely and be identified by the system. This screen 306 also allows the user to identify the reason she is joining the system. For example, a user may be joining the system to "find men to date or for a serious relationship. A second screen 304 shows an example of how further descriptive data (detailed above) may be collected.

Figure 3B:
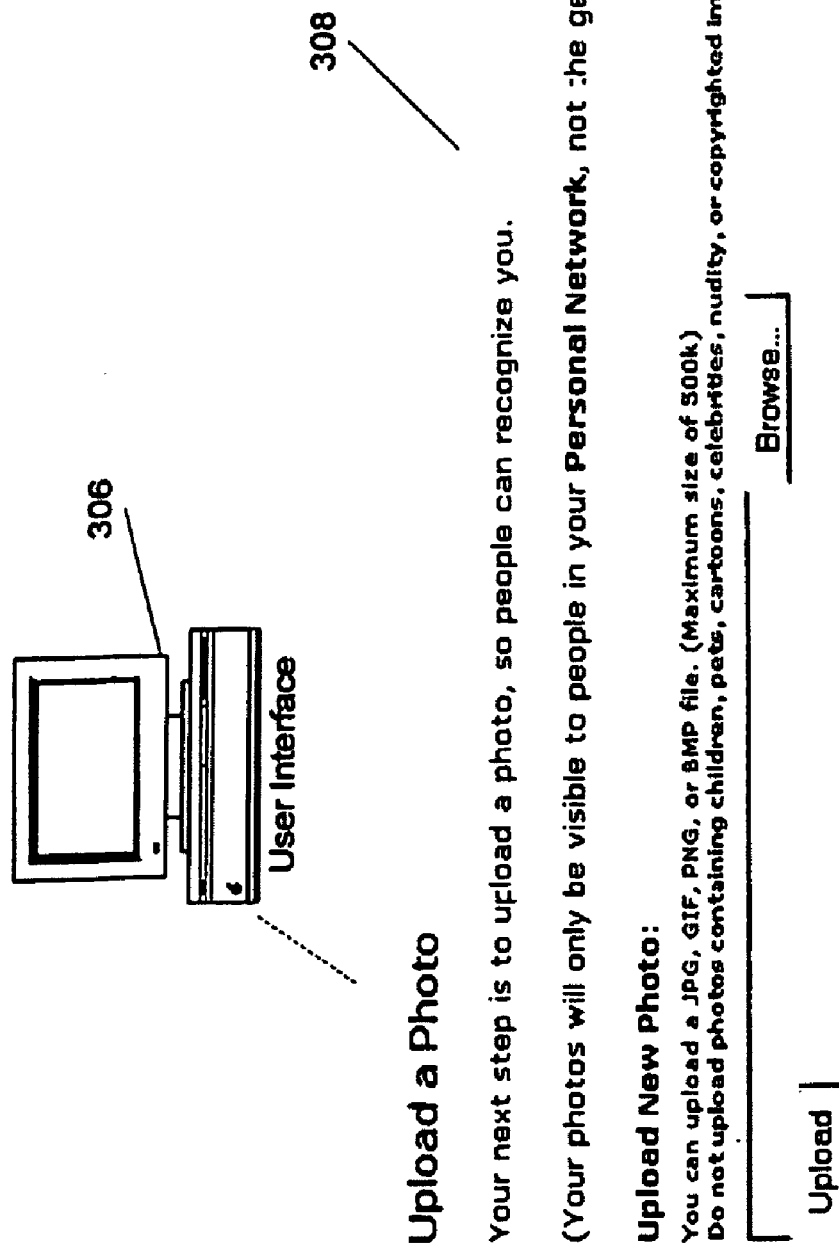
FIG. 3b shows an exemplary graphical user interface for image collection in the form of a web screen for image collection in accordance with one embodiment of the present invention.

FIG. 3b shows a diagram of an exemplary screen 308 provided to a user through the interface 306, such as over the Internet, to obtain digital images from system users. A user can through an interface 306 browse files on his own computer, select them, and then upload them to the system of the present invention. In one implementation of the present invention, the images may be reviewed by a human operator for appropriateness before being made visible to other users of the system.

FIG. 4 shows a diagram of an exemplary screen 402 provided to a user through an interface 404, such as over the Internet, to allow users to invite friends or acquaintances to join the system. The interface 404 allows the user to enter one or a plurality of e-mail addresses for friends they would like to invite to the system. The message that will be sent to the friends and/or acquaintances may include standard language describing the present system, the benefits of joining and the steps required to join the system. A user may choose to include a personal message, along with the standard invitation. The invited friend or acquaintance may initiate the process to join the system by clicking directly on an HTML link included in the e-mail message. In one embodiment of the invention, the user can import e-mail addresses from a standard computerized address book (such as that provided by Microsoft Corporation, "Microsoft Outlook"). The system can further notify the inviting user when her invitee accepts or declines the invitation to join the system.

Figure 5:
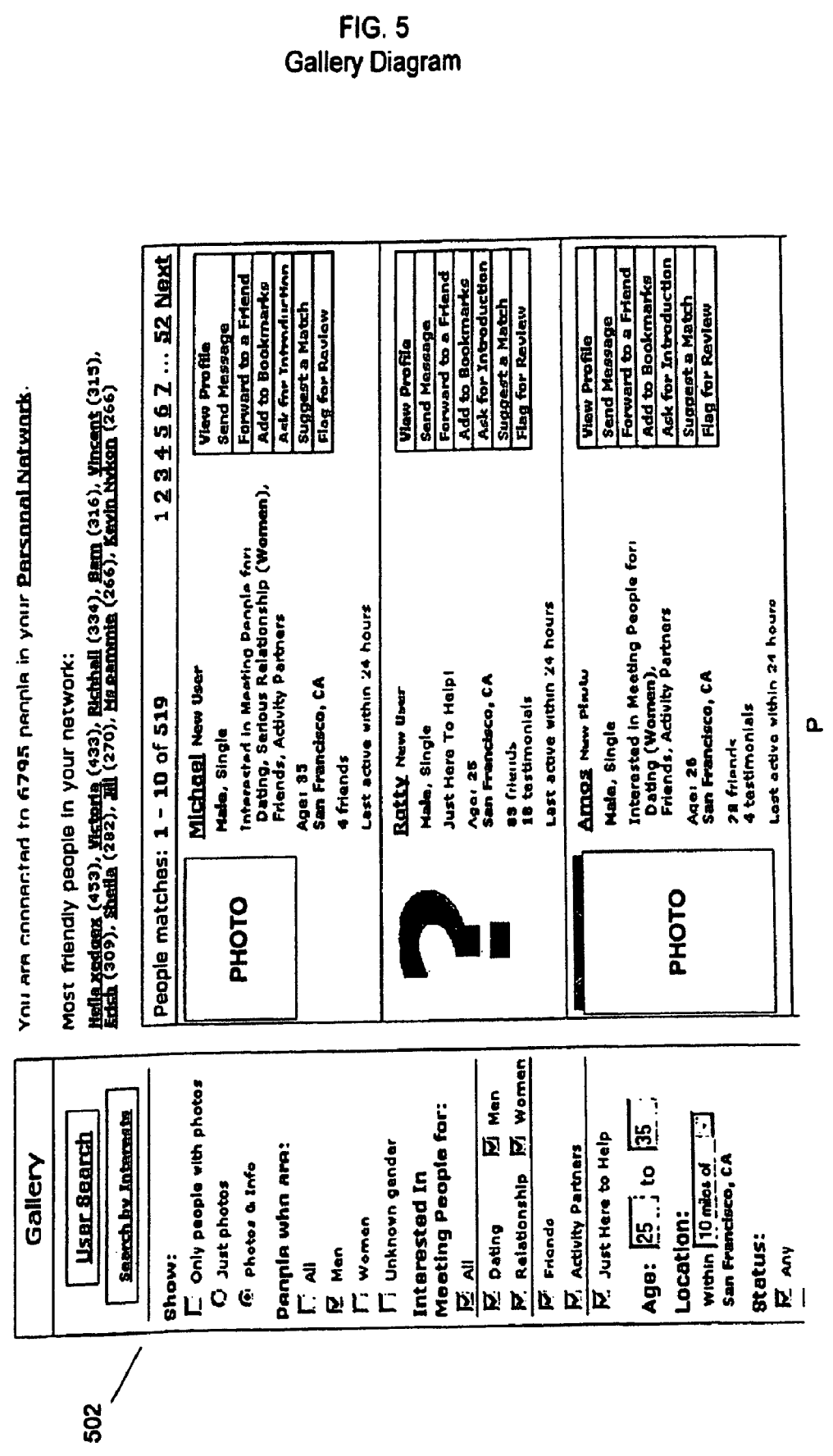

FIG. 5 shows a diagram of an exemplary screen 502 provided to a user through an interface, such as over the Internet, that presents to the user the other users within his social network. The user can screen what types of other users he sees in this "gallery." Such screening criteria about which users to display might include: whether a digital image is available, gender, interests, age, location, relationship status, when last active in the system, etc.

Still referring to FIG. 5, the data displayed about each screened user might include all of the specific data noted as being descriptive data above, such as: a digital image, gender, interests, age, location, relationship status, when last active in the system, etc. Further, if the identifier of a specific user were known, a search menu would allow that person's data to be found and displayed.

Still referring to FIG. 5, the user may act upon the individual user's profiles comprising the gallery in a number of ways. She can send a private message to the user, forward the user's profile to a friend, 'bookmark' the user (see above), request that an intermediate acquaintance facilitate an introduction, or suggest to yet another user that this particular user and the other user might make a good match.

Figure 6:
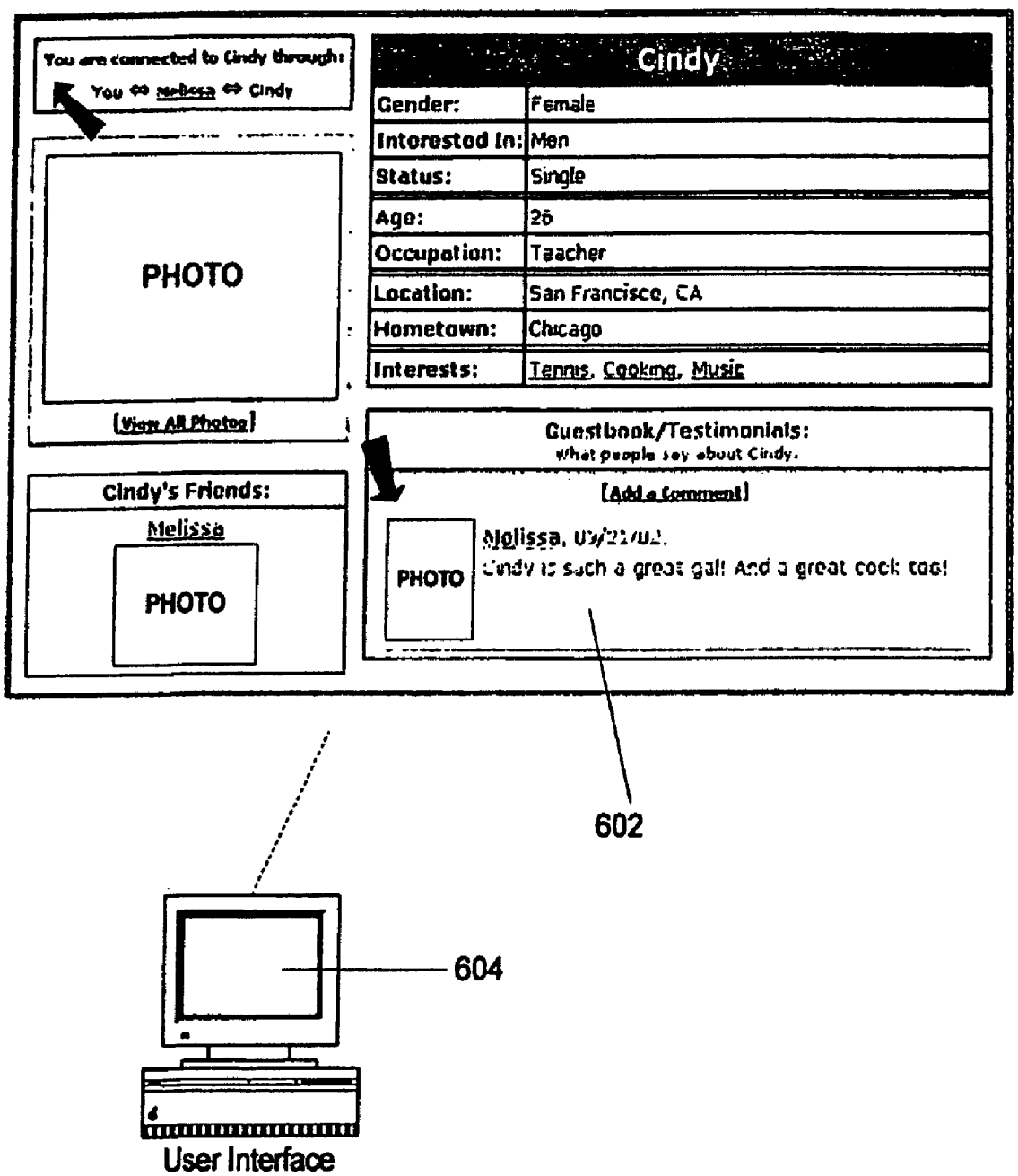
FIG. 6 shows an exemplary graphical user interface for displaying of descriptive and relationship data of an individual user in accordance with one embodiment of the present invention.

FIG. 6 shows a diagram of an exemplary screen 602 provided to a first user through an interface 604, such as over the Internet, that displays a profile—a collection of descriptive, preference and relationship data explained more fully above. In this example, descriptive data shown includes gender, status, age, occupation, location, hometown and interests. It further includes digital images of the second user, digital images of the second user's friends, and a testimonial from yet another user in the system. Preference data includes her preference for dating (in this case) men. The relationship data shows how the first user is connected to the second window through a third window.

Figure 7:
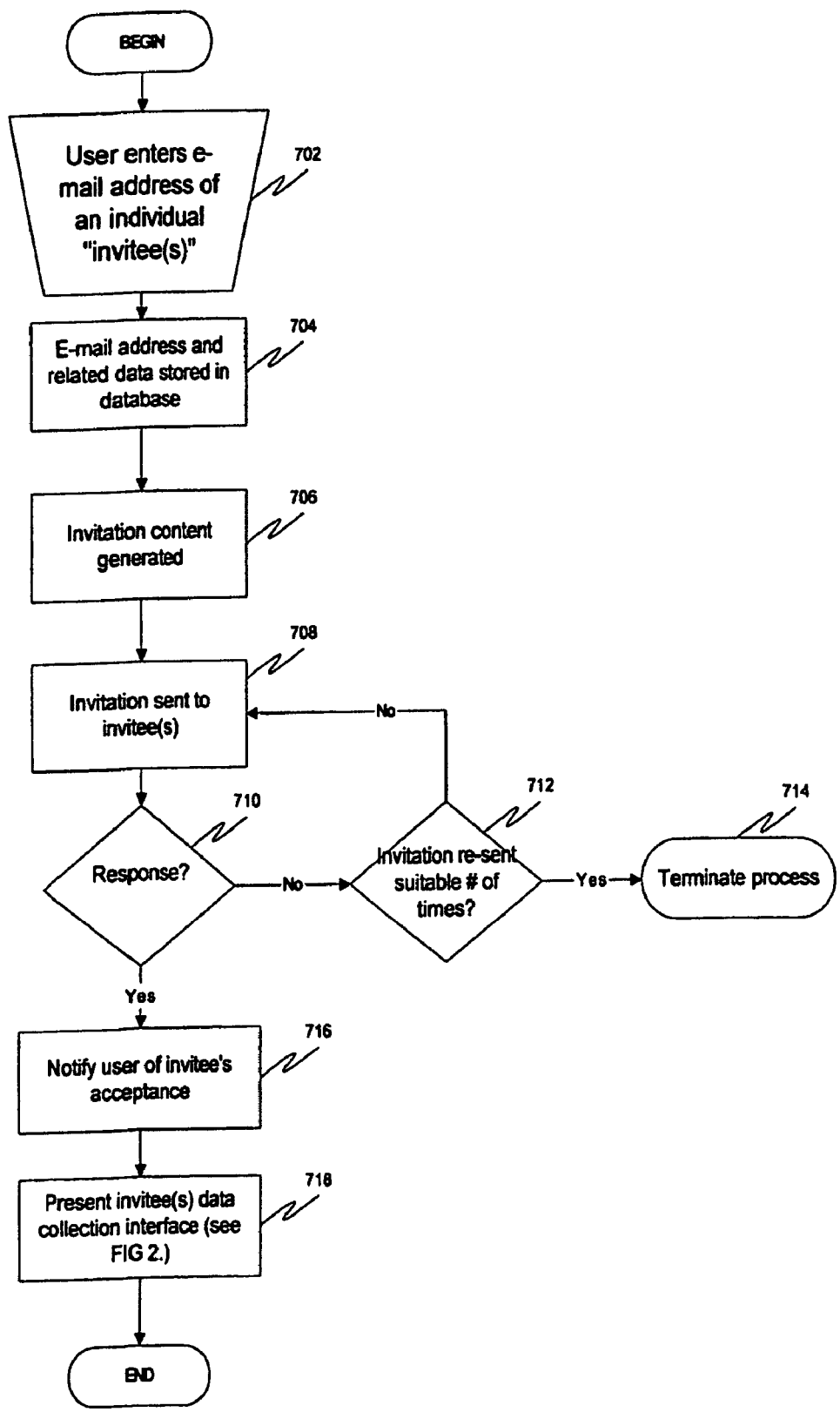
FIG. 7 shows a flowchart illustrating a process of inviting individuals to join the system in accordance with one embodiment of the present invention.

Reference is now made to FIG. 7, which is a simplified flowchart illustration of a method of inviting individuals to join the system in accordance with one embodiment of the present invention. At 702, an e-mail address is entered into an interface as described above in the description of FIG. 4. At 704, the e-mail address is stored in a database and an invitation is generated at 706. The invitation is sent through an e-mail server (see 134 in FIG. 1 and related description) at 708. At 710, the invited individual either responds by accepting the invitation or fails to respond. If the invited individual fails to respond, then the invitation may be re-sent at 708. Several events can trigger the re-sending. First, a regular update can be sent as a "reminder." For example, every Monday an update could be sent to invitees who had not yet responded. Alternatively, the user who invited the individual can self-generate a re-sending of the invitation.

After the invitation has been re-sent a suitable number of times at 712, the process can terminate at 714. Further, the process can be terminated at the request of the invited individual.

Once the individual accepts the invitation, the user who invited the individual may be notified of their invitation's acceptance at 716. After the notification of the inviting user (or, in another embodiment, concurrently; or in yet another embodiment prior to notifying the inviting user), the invited individual is presented with a sign-up, or data collection interface at 718. When an individual accepts an invitation to join the system, that individual and the inviting user may be automatically defined within the system as "friends." One embodiment of the data collection interface is presented in FIG. 3a.

Figure 8:
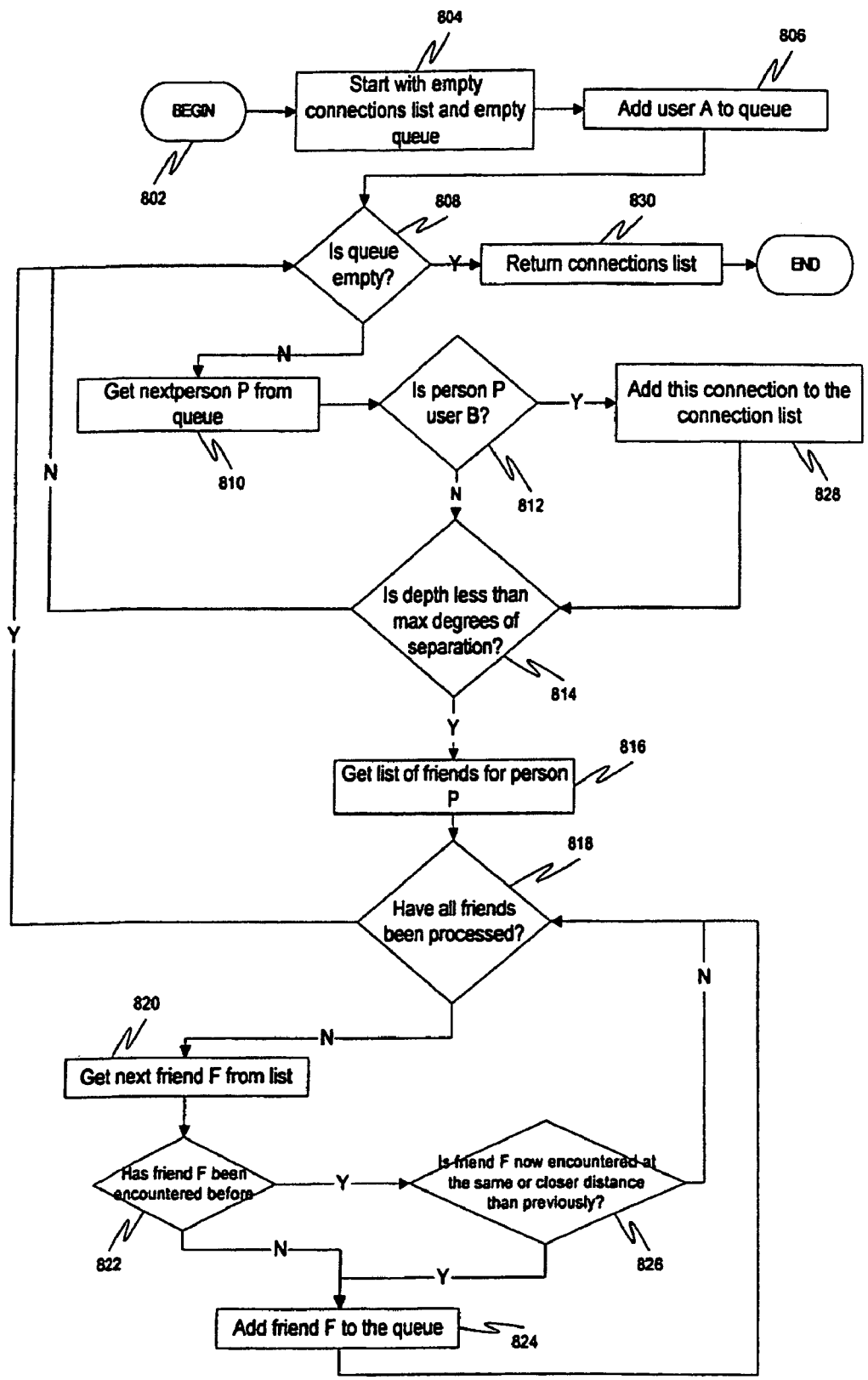
FIG. 8 shows a flowchart illustrating a process of calculating relationships among users in a social network in accordance with one embodiment of the present invention.

Reference is now made to FIG. 8, which is a flowchart illustrating the calculations performed by the present invention to calculate the path(s) of mutual acquaintances connecting any two users in the system.

The processing and decision blocks in FIG. 8 represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Referring to FIG. 8, the process of calculating a relationship between user A and user B at 802 begins with an empty queue and connections list at 804. The queue temporarily holds data during processing on a first-in-first-out basis. The connections list is a list showing a plurality of pathways connecting user A and user B. In one implementation, for example, the pathways connecting User A and User B might be represented as follows:

1. User A< >User X< >User Z< >User Y< >User B
2. User A< >User N< >User O< >User B
3. User A< >User R< >User B In the first case, user A is a friend of user X who is a friend of User Z who is a friend of user Y who is a friend of user B.

In the second case, user A is a friend of user N who is a friend of user O who is a friend of user B.

In the third case, user A is a friend of user R who is a friend of user B.

Still referring to FIG. 8, User A is added to the queue at step 806 and begins processing at 808. A check is performed at 808 to determine if the queue is empty. Since User A has just entered the queue, the queue is NOT empty, and the processing proceeds to block 810. At 810 the user designated "person P" (the first user in the queue) is removed from the queue and a check is performed at 812: "Is person P user B." In this case, since user A is NOT user B, the processing proceeds to 814. At 814, a check is performed to determine if the depth of the relationship is less than the "maximum degrees of separation" ("MDS").

MDS is a variable set by the operator or the users of the apparatus. It is an integer that describes the maximum number of "degrees of separation" that may connect two users in a social network. "Degrees of separation" is the number of connections linking any two individuals in a social network. For example, if individual A is connected to individual B through two intermediate acquaintances (C and D) they are connected at three degrees of separation.

In the above example of the first case, ("User A< >User X< >User Z< >User Y< >User B") the number of degrees of separation is four.

The check at 814 determines if person P is at less than the MDS from user A. If the answer is 'no', then no further calculations are performed with respect to person P. Further pathways involving person P would exceed the MDS, and therefore would not be displayed in any case, even if there were a pathway connecting user A and person P that was longer than the MDS.

If the answer at 814 is "yes, the depth of the relationship of person P is less than the MDS", processing proceeds to 816. At 816, the list of friends for person P is obtained. The list of friends contains all of the users of the system who have are "friends" of person P. "Friend" status is designated when two users mutually agree that they are friends, through the various methods in the system described herein.

Processing then proceeds to the check at 818. At 818, a check is executed to determine if all of the friends of person P have been processed. In the present example, the answer is "No, all the friends of person P have not been processed." Processing then proceeds to 820, where the next friend F of person P is obtained from person P's list of friends. Processing then proceeds to 822, where a check is conducted as to whether or not "friend F has been encountered before." In the present case, friend F has NOT been encountered before, so processing proceeds to the block at 824.

In an alternate pathway from 822, if friend F HAS been encountered before (for example, as part of the processing of ANOTHER users list of friends) then processing proceeds to 826. At 826 a check is performed to determine if friend F is now being encountered at the same or a lower number of degrees of separation than when it was otherwise encountered. If it is being encountered at the same or a lower number of degrees of separation than when it was otherwise encountered, then processing proceeds to 824. Alternatively, if the check results in "no, friend F is NOT now at the same or a lower number of degrees of separation than when it was otherwise encountered, then processing proceeds to 818 (see following).

At 824, the friend F is added to the queue, and processing proceeds to 818, where a check is executed to determine if all of the friends of person P have been processed. This entire subroutine (from 818 to 824) continues until all of the friends F of person P have been processed, at which point processing returns to 808.

Continuing to refer to FIG. 8, in this example, the process arrives at the check 808 with several users in the queue. These users, in this example, are the friends F of user A. The first user in the queue, designated person P is then drawn from the queue at 810 and proceeds to the check at 812 ("is person P user B"). In this case, as an example, we assume the answer is "Yes, person P is user B). Processing then continues to the block at 828, where the connection pathway is added to the connection list. Processing then continues to the check at 814.

The entire routine from 808 to 818 (and the related routine from 818 to 824) repeats itself until all of the friends F of User A, and their friends, and so forth, are processed out to the MDS set by the system operator or user. When all such processing has occurred, the check at 808 ("is the queue empty") returns "yes." At that point, processing proceeds to 830.

At 830, the list of connections captured in the processes above is returned. These connections may be displayed to the any user in multiple formats including, for example, the GUI display shown in FIG. 6.

Figure 9:
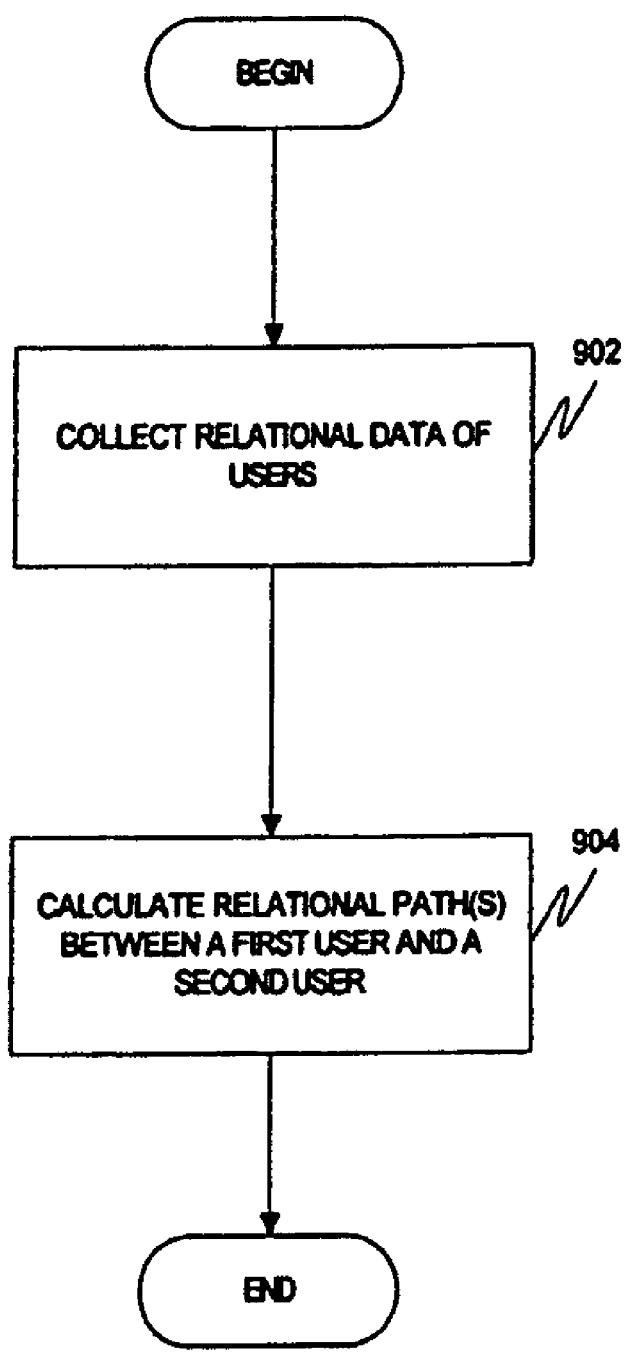
FIG. 9 shows a flowchart illustrating a method for connecting a first user to a second user in a system in accordance with one embodiment of the present invention.

FIG. 9 illustrates a method for connecting a first user to a second user in the online system as described in FIG. 1. At 902, relational data of users in the online system is collected. The relational data includes, for example, where a user has a personal relationship with another user. One of ordinary skill in the art will recognize that the relational data may include additional data on every user as described and illustrated above in FIG. 2. At 904, at least one relational path(s) between the first user and the second user is calculated based on the relational data. A relational path includes a series of at least one intermediary user. Each user has a contiguous personal relationship with the next user as illustrated above in FIG. 8. For example: user A< >user N< >User O< >User B. In this case, user A has a personal relationship with user N who has a contiguous personal relationship with user 0. User 0 has a contiguous personal relationship with user B. The above illustrated series shows user N, user 0 as intermediary users, each having a contiguous relationship.

From the description above, a number of advantages of the present invention become evident. Social interactions that were not possible prior to this invention become practical with its introduction.

The present invention increases the ease of connecting individuals in a social network. It makes it significantly easier to determine the existence of mutual interest among users, and reduces the proportion of the matching burden placed upon the third party. It allows two users of the system to realize their commonality with a mutual acquaintance (or acquaintances), with minimum effort required of the mutual acquaintance. It provides users the ability to explore the potential for mutual interest, without extensive involvement from the intermediate acquaintances.

Thus, with the present system, individuals can greatly improve the previously time-consuming, inefficient process of developing personal relationships through social networks without the assistance of an on-line computer system. By calculating and displaying social networks in a way that lets people better manage and exploit those networks, the present invention provides a clear improvement to the process of developing relationships through social networks in the "real world," and a clear advantage over any existing online "matching" or "community systems."

Figure 10:
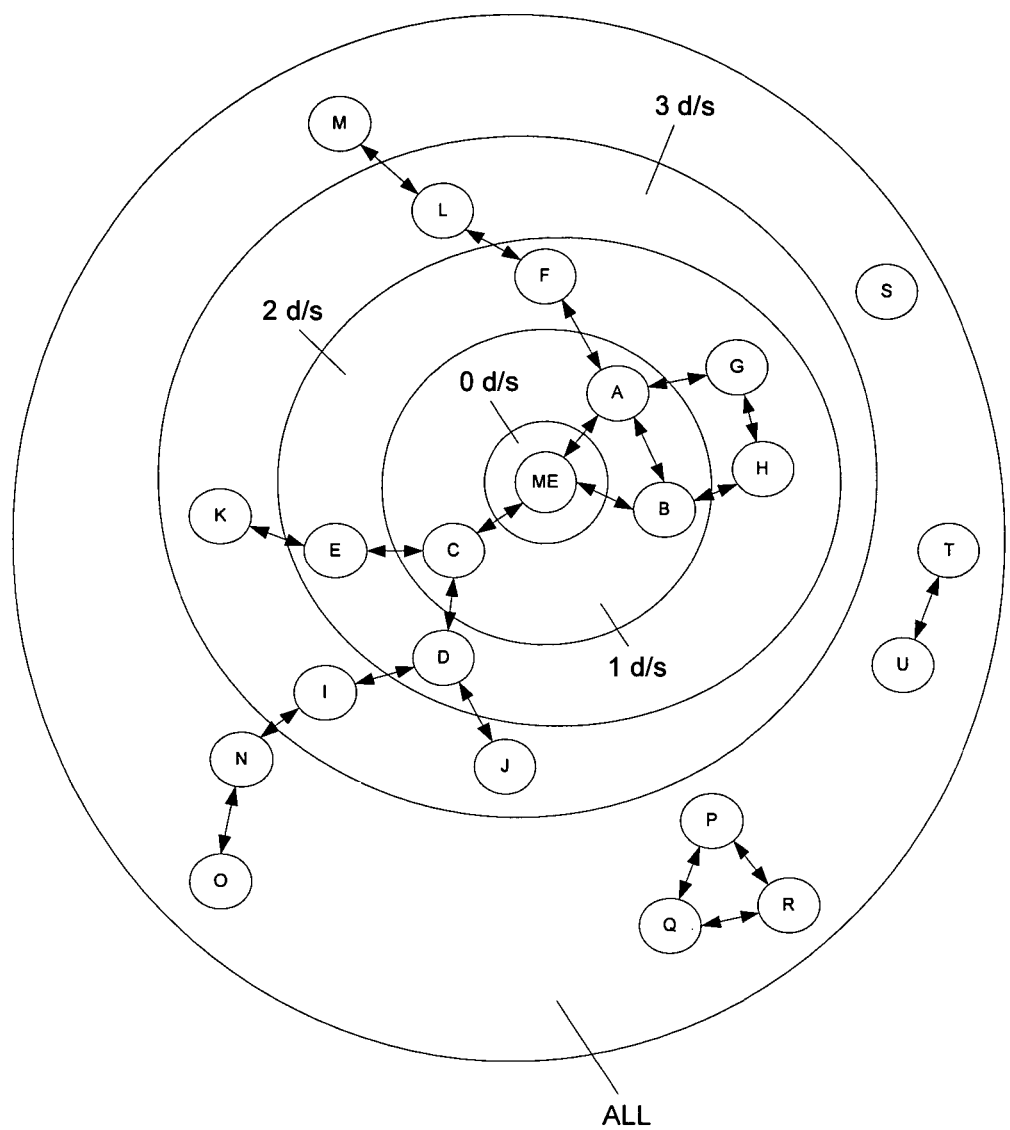
FIG. 10 is a diagram that conceptually represents the relationships between members in a social network.

FIG. 10 is a graph representation of a social network centered on a given individual (ME). Other members of this social network include A–U whose position, relative to ME's, is referred to by the degree of separation between ME and each other member. Friends of ME, which includes A, B, and C, are separated from ME by one degree of separation (1 d/s). A friend of a friend of ME is separated from ME by 2 d/s. As shown, D, E, F, G, and H are each separated from ME by 2 d/s. A friend of a friend of a friend of ME is separated from ME by 3 d/s. FIG. 1 depicts all nodes separated from ME by more than 3 degrees of separation as belonging to the category ALL.

Degrees of separation in a social network are defined relative to an individual. For example, in ME's social network, H and ME are separated by 2 d/s, whereas in G's social network, H and G are separated by only 1 d/s. Accordingly, each individual will have their own set of first, second and third degree relationships.

As those skilled in the art understand, an individual's social network may be extended to include nodes to an Nth degree of separation. As the number of degrees increases beyond three, however, the number of nodes typically grows at an explosive rate and quickly begins to mirror the ALL set.

Figure 11:
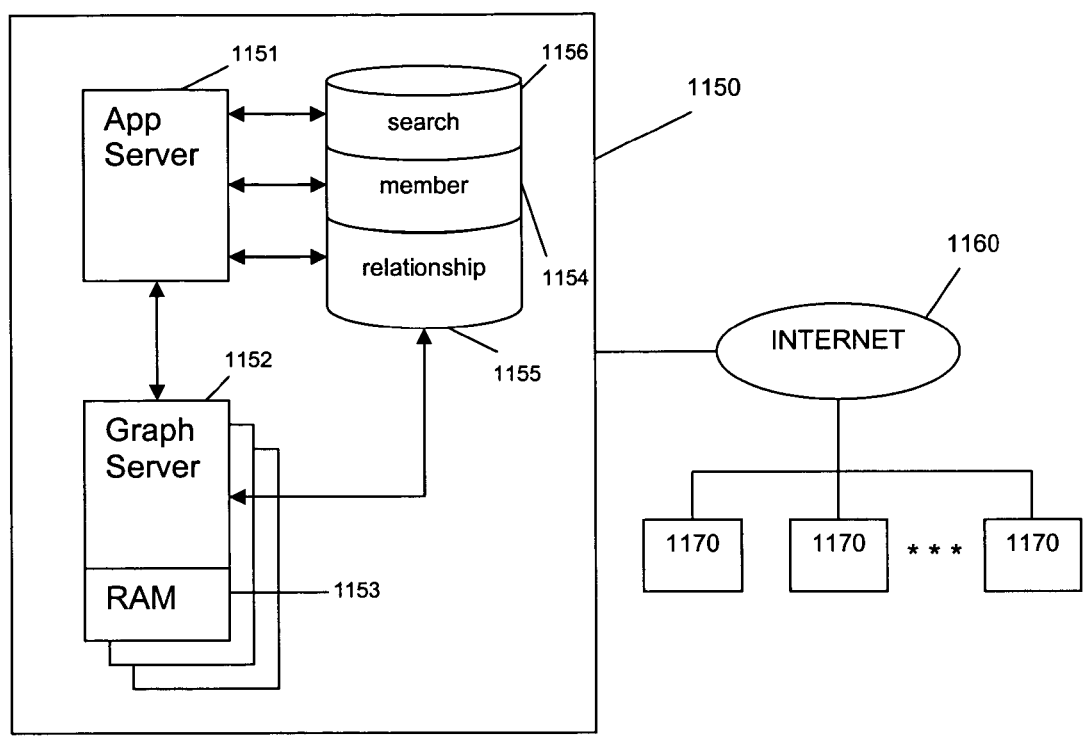
FIG. 11 is a block diagram illustrating components of a system for managing an online social network according to another embodiment of the present invention.

FIG. 11 is a block diagram illustrating a system for creating and managing an online social network. As shown, FIG. 11 illustrates a system 1150 that includes an application server 1151 and one or more graph servers 1152. The system 1150 is connected to a network 1160, e.g., the Internet, and accessible over the network by a plurality of computers, collectively designated as 1170. The application server 1150 manages a member database 1154, a relationship database 1155 and a search database 1156.

The member database 1154 contains profile information for each of the members in the online social network managed by the system 1150. The profile information may include, among other things: a unique member identifier, name, age, gender, location, hometown, references to image files, listing of interests, attributes, and the like, e.g., the data elements shown in FIG. 2. The profile information also includes VISIBILITY and CONTACTABILITY settings, the uses of which are described in a commonly owned, co-pending application, "System and Method for Managing Information Flow Between Members of an Online Social Network," application Ser. No. 10/854,057, filed May 26, 2004, the contents of which are hereby incorporated by reference. The profile information may also include a PHOTO_UPLOAD setting, which a member sets to indicate the degree of separation other members of the online social network must be within to be able to submit photos on his or her behalf. The relationship database 1155 stores information defining to the first degree relationships between members. In addition, the contents of the member database 1154 are indexed and optimized for search, and stored in the search database 1156. The member database 1154, the relationship database 1155, and the search database 1156 are updated to reflect inputs of new member information and edits of existing member information that are made through the computers 1170.

The application server 1150 also manages the information exchange requests that it receives from the remote computers 1170. The graph servers 1152 receive a query from the application server 1151, process the query and return the query results to the application server 1152. The graph servers 1152 manage a representation of the social network for all the members in the member database. The graph servers 1152 have a dedicated memory device 1153, such as a random access memory (RAM), in which an adjacency list that indicates all first degree relationships in the social network is stored. The graph servers 1152 and related components are described in detail in a commonly owned, co-pending application, "System and Method for Managing an Online Social Network," application Ser. No. 10/854,054, filed May 26, 2004, the contents of which are hereby incorporated by reference. The graph servers 1152 respond to requests from application server 1151 to identify relationships and the degree of separation between members of the online social network.

Figure 12:
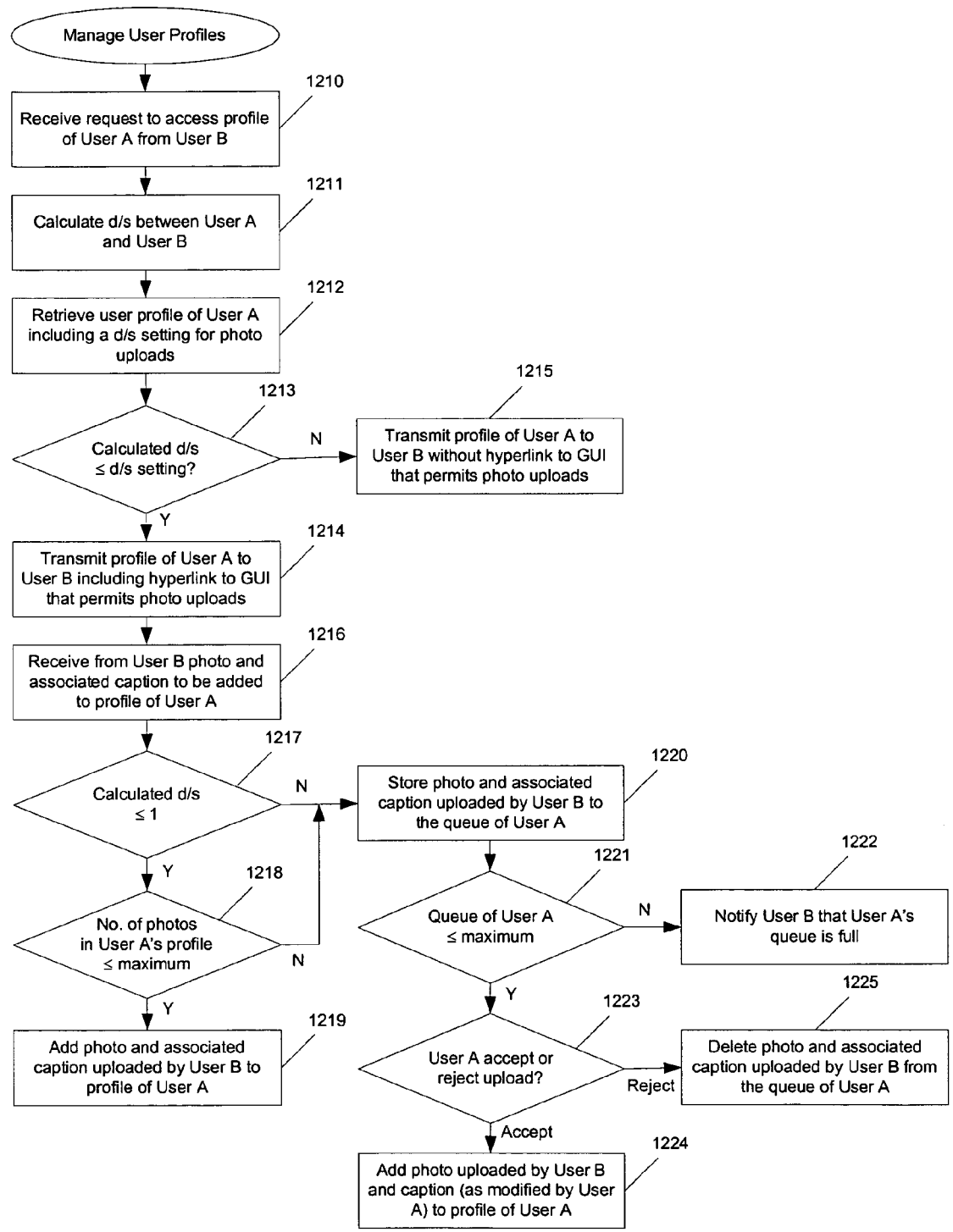
FIG. 12 is a flow diagram illustrating the method for managing photos submitted by one member of the social network on behalf of another member of the social network.

FIG. 12 is a flow diagram illustrating the process steps for managing photos submitted by one member of the online social network (e.g., User B) on behalf of another member of the online social network (e.g., User A). The individual steps shown in FIG. 12 represent the process steps carried out at the system 1150. During the photo submission process, the system 1150 communicates with and is responsive to one of the computers 1170 used by User B that is connected to the network 1160.

The photo submission process begins with User B clicking on a hyperlink to User A's profile page to access User A's profile page that is stored in the system 1150. The system 1150 receives this request (Step 1210), calculates the degree of separation (d/s) between User A and User B or retrieves this value if it already has been calculated (Step 1211), and retrieves the profile of User A including the PHOTO_UPLOAD setting (Step 1212). In Step 1213, the system 1150 checks to see if the calculated d/s is less than or equal to the PHOTO_UPLOAD setting. If it is, this signifies that User B is permitted to submit photos on behalf of User A, and so the system 1150 transmits the profile of User A to User B including a hyperlink to a GUI for submitting photo uploads on behalf of User A (Step 1214). If not, this signifies that User B is not permitted to submit photos on behalf of User A, and so the system 1150 transmits the profile of User A to User B without a hyperlink to a GUI for submitting photo uploads on behalf of User A (Step 1215).

The default value of the PHOTO_UPLOAD setting is one. In some embodiments of the invention, the PHOTO_UPLOAD setting may not be used. In both of these cases, the system only permits a friend of a member to submit photos on behalf of that member.

FIG. 13 is a sample GUI using which a member of the online social network (e.g., User B) can submit a photo on behalf of another member of the online social network (e.g., User A). This GUI is displayed on the computer 1170 that User B is using to connect to the system 1150. It includes a form 1300 which has a first input field 1311 in which the name of the image file containing the photo that User B desires to upload is to be specified, and a second input field 1312 in which User B can optionally input a caption associated with the photo. After User B confirms the values in the input fields and clicks on the SUBMIT button 1313, the image file and the associated caption are transmitted to the system 1150.

In Step 1216, the image file and the associated caption transmitted to the system 1150 from User B's computer 1170 is received by the system 1150. Then, in Step 1217, the system 1150 checks to see if the degree of separation between User A and User B (previously calculated or retrieved in Step 1211) is less than or equal to one. If it is and the number of photos in User A's profile does not exceed the maximum (Step 1218), the uploaded photo and associated caption is automatically added to User A's profile (Step 1219). If not, or the number of photos in User A's profile exceeds the maximum, the uploaded photo and associated caption is placed in a pending photo queue of A (Step 1220). If the pending photo queue of A is full (Step 1221), then User B is notified that this queue is full (Step 1222). If not, then User A is given the opportunity to accept or reject the uploaded photo and associated caption using a GUI for managing uploaded photos.

Figure 14:
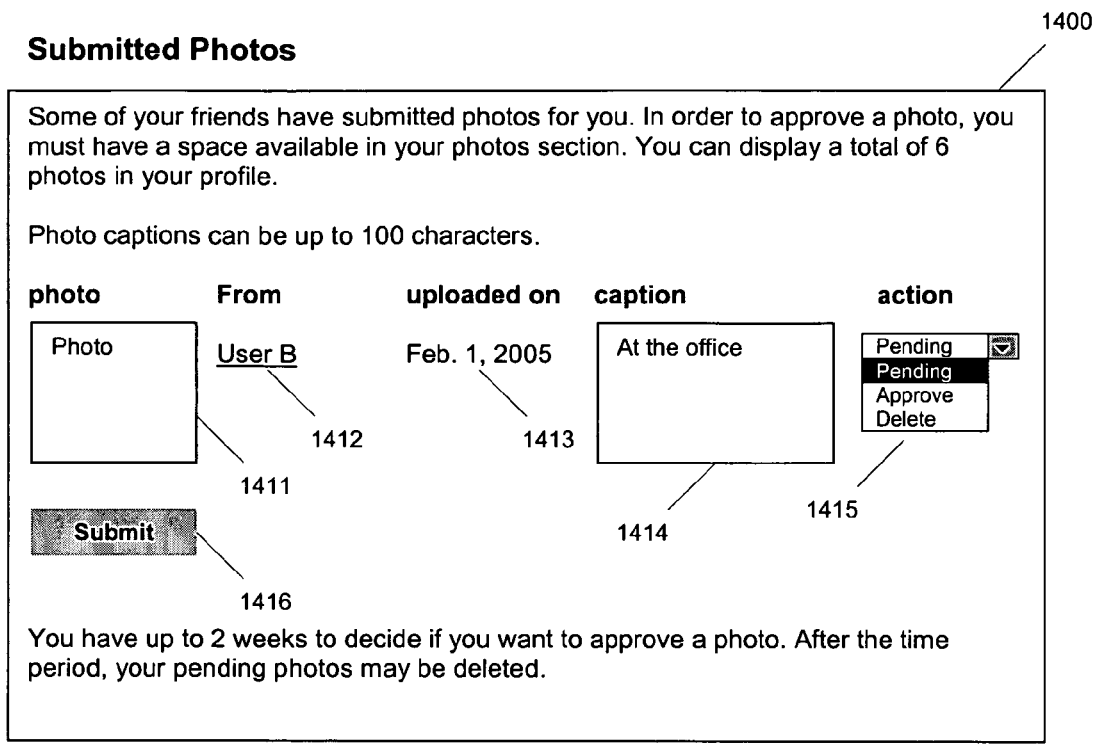
FIG. 14 is a sample graphical user interface for approving or rejecting photos submitted by another member of the social network.

FIG. 14 is a sample GUI using which a member of the online social network (e.g., User A) can approve or reject photos submitted by another member of the social network (e.g., User B). This GUI is displayed on the computer 1170 that User A is using to access the system 1150. It includes a form 1400 which displays information about one or more photos that are in the queue of User A, namely the photo 1411, the ID 1412 of the member who submitted the photo, the date 1413 that the photo was uploaded, and the caption 1414 associated with the photo. The caption 1414 is displayed as an editable text field so that User A can make any changes. The form 1400 also has a drop-down menu 1415 using which User A can specify that the corresponding uploaded photo entry is to be approved (added to his or her profile) or deleted. After User A confirms the caption 1414 and the action specified in the drop-down menu 1415 and clicks on the SUBMIT button 1416, the photo 1411 and the caption 1414 are added to User A's profile.

In Step 1223, the flow branches in accordance with the action specified by User A in the drop-down menu 1415. If the user accepts, the uploaded photo and the associated caption, as modified by User A, are added to User A's profile (Step 1224). If the user rejects, the uploaded photo and the associated caption are deleted from the pending photo queue of A (Step 1225).

In a slightly different embodiment of the invention, the system 1150 does not add the uploaded photo and the associated caption to the profile of User A unless it first receives approval from User A. In other words, all uploaded photos and associated captions are first placed in the pending photo queue of User A regardless of how closely related the second member is to the first member. In such an embodiment, Steps 1217–1219 of FIG. 12 would not be executed and flow would proceed directly from Step 1216 to Step 1220.

While particular embodiments according to the invention have been illustrated and described above, those skilled in the art understand that the invention can take a variety of forms and embodiments within the scope of the appended claims.

What is claimed is:

1. In a computer system including a server computer and a database of registered users that stores for each registered user, a user ID of the registered user and user IDs of registered users who are directly connected to the registered user, a method of managing content associated with the registered users, the method comprising the steps of:

storing content relating to a first registered user that is submitted by a second registered user;

retrieving a maximum degree of separation, wherein two registered users who are directly connected are deemed to be separated by one degree of separation and two registered users who are connected through no less than one other registered user are deemed to be separated by two degrees of separation and two registered users who are connected through no less than N other registered users are deemed to be separated by N+1 degrees of separation;

calculating a degree of separation between the first registered user and the second registered user;

requesting approval of the content from the first registered user if the calculated degree of separation is greater than the maximum degree of separation;

receiving approval of the content from the first registered user; and associating the content with the first registered user.

2. The method according to claim 1, wherein the content comprises an image file containing an photo image of the first registered user.

3. The method according to claim 2, wherein the content further comprises a caption associated with the photo image.

4. The method according to claim 1, further comprising the steps of:

receiving a request to view a profile of the first registered user; and transmitting the content in response to the request.

5. The method according to claim 1, wherein the step of associating comprises the step of associating the content to a profile of the first registered user.

6. The method according to claim 1, wherein the maximum degree of separation is one.

7. The method according to claim 1, further comprising the steps of receiving an input of the maximum degree of separation from the first registered user and storing the maximum degree of separation.

8. In a computer system including a server computer and a database of registered users that stores for each registered user, a user ID of the registered user and user IDs of registered users who are directly connected to the registered user, a method of managing content uploads, the method comprising the steps of:

receiving a request to view a profile of a first registered user from a second registered user;

retrieving a maximum degree of separation, wherein two registered users who are directly connected are deemed to be separated by one degree of separation and two registered users who are connected through no less than one other registered user are deemed to be separated by two degrees of separation and two registered users who are connected through no less than N other registered users are deemed to be separated by N+1 degrees of separation;

calculating a degree of separation between the first registered user and the second registered user; and if the calculated degree of separation is less than or equal to the maximum degree of separation, transmitting the profile of the first registered user to the second registered user and a hyperlink to a GUI that permits the second registered user to upload content relating to the first registered user on behalf of the first registered user.

9. The method according to claim 8, wherein the maximum degree of separation is one.

10. The method according to claim 8, further comprising the steps of:

if the calculated degree of separation is one, storing the content uploaded by the second registered user and associating the uploaded content to the profile of the first registered user; and if the calculated degree of separation is greater than one, storing the content uploaded by the second registered user and associating the uploaded content to the profile of the first registered user upon receipt of an approval of the uploaded content by the first registered user.

11. The method according to claim 10, further comprising the steps of:

receiving another request to view the profile of the first registered user; and transmitting the uploaded content in response to the request.

12. The method according to claim 8, further comprising the steps of receiving an input of the maximum degree of separation from the first registered user and storing the maximum degree of separation.

13. The method according to claim 8, further comprising the steps of:

storing the content uploaded by the second registered user;

transmitting a request to the first registered user for approval of the uploaded content; and associating the uploaded content to the profile of the first registered user upon receipt of the approval from the first registered user.

14. A user profile management system, comprising:

a memory device including a database of registered users that stores for each registered user, a user profile, a user ID of the registered user, user IDs of registered users who are directly connected to the registered user, and a maximum degree of separation, wherein two registered users who are directly connected are deemed to be separated by one degree of separation and two registered users who are connected through no less than one other registered user are deemed to be separated by two degrees of separation and two registered users who are connected through no less than N other registered users are deemed to be separated by N+1 degrees of separation; and a processing unit programmed to calculate the degree of separation between a first registered user and a second registered user and permit upload of content relating to the first registered user from the second registered user if the degree of separation between the first registered user and the second registered user is less than or equal to the maximum degree of separation.

15. The system according to claim 14, wherein the maximum degree of separation is one.

16. The system according to claim 15, wherein the processing unit is further programmed to prompt the first registered user to specify the maximum degree of separation.

17. The system according to claim 14, wherein the processing unit is further programmed to receive and store the uploaded content and to associate the uploaded content to the first registered user.

18. The system according to claim 17, wherein the processing unit is further programmed to receive a request to view a profile of the first registered user and to transmit the uploaded content in response to the request.

19. The system according to claim 18, wherein the uploaded content comprises an image file containing a photo image of the first registered user.

20. The system according to claim 19, wherein the uploaded content further comprises a caption associated with the photo image.

* * * * *